US009755272B2

(12) United States Patent
Gaben

(10) Patent No.: US 9,755,272 B2
(45) Date of Patent: Sep. 5, 2017

(54) PROCESS FOR MANUFACTURING A MONOLITHIC ALL-SOLID-STATE BATTERY

(71) Applicant: I-TEN, Champagne-au-Mont-d'Or (FR)

(72) Inventor: Fabien Gaben, Ecully (FR)

(73) Assignee: I-TEN, Champagne-au-Mont-d'Or (FR)

( * ) Notice: Subject to any disclaimer, the term of this patent is extended or adjusted under 35 U.S.C. 154(b) by 137 days.

(21) Appl. No.: 14/770,801

(22) PCT Filed: Feb. 27, 2014

(86) PCT No.: PCT/FR2014/050424
§ 371 (c)(1),
(2) Date: Aug. 26, 2015

(87) PCT Pub. No.: WO2014/131997
PCT Pub. Date: Sep. 4, 2014

(65) Prior Publication Data
US 2016/0013513 A1 Jan. 14, 2016

(30) Foreign Application Priority Data

Feb. 28, 2013 (FR) ..................................... 13 51810

(51) Int. Cl.
*H01M 10/0562* (2010.01)
*H01M 4/1391* (2010.01)
*H01M 4/36* (2006.01)
*H01M 4/62* (2006.01)
*H01M 10/0525* (2010.01)
*H01M 10/0585* (2010.01)
*C25D 13/16* (2006.01)
*H01M 10/04* (2006.01)
*H01M 4/04* (2006.01)

(52) U.S. Cl.
CPC ........ *H01M 10/0562* (2013.01); *C25D 13/16* (2013.01); *H01M 4/0416* (2013.01); *H01M 4/0419* (2013.01); *H01M 4/0423* (2013.01); *H01M 4/0426* (2013.01); *H01M 4/0428* (2013.01); *H01M 4/0457* (2013.01); *H01M 4/1391* (2013.01); *H01M 4/366* (2013.01); *H01M 4/62* (2013.01); *H01M 4/622* (2013.01); *H01M 10/0468* (2013.01); *H01M 10/0525* (2013.01); *H01M 10/0585* (2013.01); *H01M 4/0421* (2013.01); *H01M 4/0438* (2013.01); *H01M 2300/0068* (2013.01)

(58) Field of Classification Search
CPC ....................... H01M 10/052; H01M 10/0562
See application file for complete search history.

(56) References Cited

U.S. PATENT DOCUMENTS

2007/0184345 A1* 8/2007 Neudecker .......... H01M 4/0404
429/209

* cited by examiner

Primary Examiner — Olatunji Godo
(74) Attorney, Agent, or Firm — Jordan IP Law, LLC; Todd A. Vaughn

(57) ABSTRACT

An all-inorganic, all-solid-state monolithic Li-ion battery, the monolithic body having a plurality of elementary cells, and which is produced by producing dense electrode deposits directly on the two faces of a substrate acting as a battery current collector, and by depositing an all-solid-state dense electrolyte layer on at least one of the dense electrode deposits obtained.

25 Claims, 7 Drawing Sheets

PROCESS FOR MANUFACTURING A MONOLITHIC ALL-SOLID-STATE BATTERY

CROSS-REFERENCE TO RELATED APPLICATIONS

The present application is a National Stage Application of PCT International Application No. PCT/FR2014/050424 (filed on Feb. 27, 2014), under 35 U.S.C. §371, which claims priority to French Patent Application No. A 1351810 (filed on Feb. 28, 2013), which are each hereby incorporated by reference in their respective entireties.

FIELD OF THE INVENTION

This invention relates to the field of batteries and in particular lithium ion batteries. It relates more specifically to all-solid-state lithium ion batteries, and a novel process for manufacturing such batteries.

BACKGROUND

The modes for manufacturing lithium ion batteries ("Li-ion batteries") are presented in many articles and patents, and the work "Advances in Lithium-Ion Batteries" (ed. W. van Schalkwijk and B. Scrosati), published in 2002 (Kluever Academic/Plenum Publishers) provides a good assessment of them. The electrodes of Li-ion batteries can be produced by means of printing or deposition techniques known to a person skilled in the art (in particular: roll coating, doctor blade, tape casting). These techniques make it possible to produce depositions having a thickness of between 50 and 400 µm. Depending on the thickness of the depositions, their porosities and the size of the active particles, the power and energy of the battery may be modulated.

More recently, other Li-ion battery architectures have appeared. These are primarily all-solid-state thin-film microbatteries. These microbatteries have a planar architecture, that is, they consist essentially of an assembly of three layers forming an elementary battery cell: an anode layer and a cathode layer separated by an electrolyte layer. These batteries are said to be "all-solid-state" because the two electrodes (anode and cathode) and the electrolyte are made of non-porous solid materials. These batteries have an important advantage owing to their superior performance to those of conventional electrolyte-based batteries including lithium salts dissolved in an aprotic solvent (liquid or gel electrolyte). The absence of liquid electrolyte considerably reduces the risks of internal short-circuit and thermal runaway in the battery.

Different vacuum deposition techniques have been used to produce thin-film microbatteries. In particular, physical vapor deposition (PVD) is the technique most commonly used at present to produce these thin-film microbatteries. This technique makes it possible to produce high-quality electrode and electrolyte layers without porosity. These layers are generally thin (generally less than 5 µm) so as not to cause excessive power loss associated with an increase in the electrode thicknesses.

Numerous approaches have been proposed in order to produce all-solid-state batteries. In general, these approaches are based only on high-pressure mechanical compaction of electrode and electrolyte material powders (Journal of Power Sources, 2009, 189, 145-148 H. Kitaura). Nevertheless, the electrode and electrolyte layers obtained are porous and the adhesion between them is not optimal, so that the internal resistance of said batteries is too high and does not enable a high power to be generated.

To improve the performance of all-solid-state batteries, a number of sintering techniques have been used, either using thermal treatments (Journal of Power Sources, 2007, 174, K. Nagata) or pulsed current (Material Research Bulletin, 2008, X. Xu). However, sintering leads to significant shrinkage and/or the use of high temperature. Consequently, it is not possible to perform the all-solid-state electrode deposition on conductive metal substrates, and more specifically aluminum substrates. Indeed, an excessively high temperature would oxidize or significantly deteriorate the metal substrate. Moreover, the layer deposited on the substrate would lead to the appearance of cracks during sintering. These disadvantages require current collectors to be deposited on the ends of the battery cell formed by a cathode/electrolyte/anode stack. Consequently, the restriction associated with the deposition of current collectors does not make it possible to produce a three-dimensional battery assembly, all-solid-state, monolithic, consisting of a plurality of elementary cells.

SUMMARY

This invention is therefore intended for producing an all-solid-state monolithic Li-ion battery, the monolithic body consisting of a plurality of elementary cells, by producing dense electrode deposits directly on the two faces of a substrate acting as a battery current collector, and by depositing an all-solid-state dense electrolyte layer on at least one of the dense electrode deposits obtained.

This invention relates to a process for producing all-solid-state batteries, said batteries including at least one dense layer containing anode materials ("anode layer"), at least one dense layer containing solid electrolyte materials ("electrolyte layer"), and at least one dense layer containing cathode materials ("cathode layer"), in order to obtain an all-solid-state battery consisting of an assembly of a plurality of elementary cells, the process including the following steps:

a) a dense anode layer and a dense cathode layer are each deposited on their respective conductive substrates, said conductive substrates being capable of serving as an anode and cathode current collector, respectively;

b) a dense solid electrolyte layer is deposited on at least one of the two layers obtained in step a);

c) a layer containing at least one Ms inorganic bonding material is deposited on at least one of the layers obtained in step a) and/or b); with the understanding that the depositions of the layers of step a), b) and c) are not all performed by electrophoresis;

d) the layer obtained in step c) is stacked face-to-face with a layer obtained in step a), b) or c);

e) a mechanical compression promoting contact between said two layers stacked face-to-face is performed in order to obtain an all-solid-state assembly of elementary cells, capable of functioning as a battery.

In a preferred embodiment, in addition to the mechanical compression performed in step e) a step of thermal treatment is performed.

Preferably, the deposition of the anode and cathode layer is performed on the two faces of their respective conductive substrates.

In a preferred embodiment, the thermal treatment performed in step e) is performed at a temperature TR which, preferably, does not exceed 0.7 times the melting or decomposition temperature (expressed in ° C.), and more preferably does not exceed 0.5 times (and even more preferably does not exceed 0.3 times) the melting or decomposition temperature (expressed in ° C.) of the at least one most fusible Ms bonding material subjected to said thermal treatment step. Similarly, the mechanical compression of the assembly obtained in step e) is performed at a pressure of between 10 and 100 MPa, preferably between 10 and 50 MPa.

The deposition of the layers of step a), b) and c) are performed by vapor phase and/or by wet deposition, and mores specifically at least one of the following techniques:

i) physical vapor deposition (PVD), and more specifically vacuum evaporation, laser ablation, ion beam, cathode sputtering;

ii) chemical vapor deposition (CVD) and more specifically plasma-enhanced chemical vapor deposition (PECVD), laser-assisted chemical vapor deposition (LACVD), or aerosol-assisted chemical vapor deposition (AA-CVD);

iii) electrospraying;
iv) aerosol deposition;
v) electrophoresis;
vi) sol-gel;
vii) dipping, more specifically dip-coating, spin-coating or the Langmuir-Blodgett process.

The Ms bonding material is preferably selected from one or more of the following materials:

a) oxide-based materials chosen from $Li_{3.6}Ge_{0.6}V_{0.4}O_4$; $Li_2O$—$Nb_2O_5$; $LiSiO_4$; $Li_2O$; $Li_{14}Zn(GeO_4)_4$; $Li_6Zr_2O_7$; $Li_8ZrO_6$; $Li_{0.35}La_{0.55}TiO_3$; $Li_{0.5}La_{0.5}TiO_3$; $Li_7La_3Zr_2O_{12}$; $Li_{5+x}La_3(Zr_x,A_{2-x})O_{12}$ with A=Sc, Ti, V, Y, Nb, Hf, Ta, Al, Si, Ga, Ge, Sn and $1.4 \leq x \leq 2$;

b) nitride- or oxynitride-based materials chosen from $Li_3N$; $Li_3PO_4$-$xN_{2x/3}$, $Li_4SiO_4$-$xN_{2x/3}$, $Li_4GeO_4$-$xN_{2x/3}$ with $0<x<4$ or $Li_3BO_3$-$xN_{2x/3}$ with $0<x<3$; lithium and phosphorus oxynitride-based materials (called LiPON) that may also contain silicon (called LiSiPON), boron (called LiPONB), sulfur (called LiPONS), zirconium or aluminum (called LiPAON) or a combination of aluminum, boron, sulfur and/or silicon; the lithium and boron oxynitride-based materials (called LiBON) that may also contain silicon (called LiSiBON), sulfur (called (LIBONS) or aluminum (called LiBAON) or a combination of aluminum, sulfur and silicon; and more specifically materials of the $Li_xPO_yN_z$ type with x~2.8 and 2y=3z with $0.16 \leq z \leq 0.46$; or $Li_wPO_x$-$N_ySz$ with $(2x+3y+2z)=(5+w)$ and $3.2 \leq x \leq 3.8$; $0.13 \leq y \leq 0.4$; $0 \leq z \leq 0.2$; $2.9 \leq w \leq 3.3$; or $Li_tP_xAl_yO_uN_vS_w$ with $(5x+3y)=5$; $(2u+3v+2w)=(5+t)$; $2.9 \leq t \; 3.3$; $0.84 \leq x \leq 0.94$; $0.094 \leq y \leq 0.26$; $3.2 \leq u \leq 3.8$; $0.13 \leq v \leq 0.46$; $0 \leq w \leq 0.2$; or $Li1.9Si0.2P1.0O1.1N1.0$; or $Li2.9PO3.3N0.46$; or $Li6-0.75xP1.75xZr2-2xO7-yNz$ with $z \leq 14/3$; $2y=3z$ and $x \leq 0.8$; or $Li8-3.5xP1.5xZr1-xOz6-yNz$ with $x \leq 0.8$; $z \leq 4$ and $2y=3z$; or $Li8-3xLaxZrO6-yNz$ with $O \leq x \leq 2$; $z \leq 4$ and $2y=3z$; or $Li_3(Sc_{2-x}M_x)(PO_4-yN_z)$ with $x \leq 2$; $z \leq 8/3$; $2y=3z$ and M=Al, Y or $Al_{1-a}Y_a$ with $a<1$;

c) sulfide-based materials chosen from: $Li_xM_{1-y}M'_yS_4$ with M=Si, Ge, Sn and M'=P, Al, Zn, Ga, Sb; $Li_2S$; $B_2S_3$; $P_2S_5$; $70Li_2S$-$30P_2S_5$; $Li_7P_3S_{11}$; $Li_{10}GeP_2S_{12}$; $Li_7PS_6$; $Li_{3.25}Ge_{0.25}P_{0.75}S_4$; $Li_{10}MP_2S_{12}$ with M=Si, Ge, Sn and mixtures between $Li_2S$ and one of the compounds among $P_2S_5$, $GeS_2$, $Ga_2S_3$ or $SiS_2$;

d) phosphate or borate-based materials chosen from $Li_3PO_4$; $LiTi(PO_4)_3$; $Li_{1+x}Al_xM_{2-x}(PO_4)_3$ (where M=Ge, Ti, and/or Hf and $0 \leq x \; 1$); $Li_{1.3}Al_{0.3}Ti_{1.7}(PO_4)_3$; $Li_{1+x+y}Al_xTi_{2-x}Si_yP_{3-y}O_{12}$ (where $0 \leq x \leq 1$ and $0 \leq y \leq 1$); $Li_{1+x+z}M_x(Ge_{1-y}Ti_y)_{2-x}Si_zP_{3-z}O_{12}$ (where $0 \leq x \leq 0.8$, $0 \leq y \leq 1.0$, $0 \leq z \leq 0.6$); $2(Li1.4Ti2Si0.4P2.6O12)$-$AIPO4$; $Li_xAl_z$-$yGa_yS_w(PO_4)_c$ or $Li_xAl_z$-$yGa_yS_w(BO_3)_c$ or $Li_xGe_z$-$yS_iyS_w(PO_4)_c$ or $Li_xGe_z$-$yS_iyS_w(BO_3)_c$ or more generally $Li_xM_z$-$yM'_yS_w(PO_4)_c$ or $Li_xM_z$-$yM'_yS_w(BO_3)_c$ with $4 \leq w \leq 20$, $3 \leq x \leq 10$, $0 \leq y \leq 1$, $1 \; I \leq z \; 4$ and $0 \leq c \leq 20$ and M or M' an element among Al, Si, Ge, Ga, P, Zn, Sb; or $Li_3Sc_2$-$xM_xPO_4$ with M=Al, Y or $Al_{1-a}Y_a$ with $a<1$;

e) mixed materials chosen from the mixtures between $Li_2S$ and one of the compounds among $Li_3PO_4$, $Li_3PO_4$-$xN_{2x/3}$, $Li_4SiO_4$-$xN_{2x/3}$, $Li_4GeO_4$-$xN_{2x/3}$ with $0<x<4$ or $Li_3BO_3$-$xN_{2x/3}$ with $0<x<3$; the mixtures between $Li_2S$ and/or $B_2S_3$ $SiS_2$, $P_2S_5$, $GeS_2$, $Ga_2S_3$ and a compound of the $Li_aMO_b$ type, which may be a lithium silicate $Li_4SiO_4$, a lithium borate $Li_3BO_3$ or a lithium phosphate $Li_3PO_4$.

Advantageously, the thickness of the layer of the at least one Ms bonding material is less than 100 nm, preferably less than 50 nm, and even more preferably less than 30 nm.

In a preferred embodiment, the layer containing at least one Ms bonding material is a nanoparticle layer deposited on at least one of the dense layers obtained in step a), b) or c). Advantageously, it is deposited by electrophoresis.

Advantageously, the conductive anode or cathode current substrates are metal sheets, optionally coated with a noble metal, or polymer sheets, optionally coated with a noble metal, or graphite sheets, optionally coated with a noble metal. More specifically, the conductive anode or cathode current substrates in the form of metal sheets are aluminum, copper or nickel. More specifically, the conductive anode or cathode current substrates in the form of polymer sheets are selected from the following polymers: polyethylene naphthalate (PEN), polyethylene terephthalate (PET), polypropylene (PP), Teflon® (PTFE), polyimide (PI) and more specifically Kapton®.

Advantageously, the noble metal is selected from the following metals: gold, platinum, palladium, vanadium, cobalt, nickel, manganese, niobium, tantalum, chromium, molybdenum, titanium, palladium, zirconium, tungsten or any alloy including at least one of these metals.

The invention also relates to an all-solid-state battery capable of being produced by the process according to the invention, said battery including a monolithic body formed by at least one dense layer containing anode materials, at least one dense layer containing solid electrolyte materials and at least one dense layer containing cathode materials; preferably, the monolithic body of the battery consists of a plurality of elementary cells connected in parallel. Advantageously, the electrical continuity between two adjacent cells is ensured by the electrolyte.

The battery capable of being obtained by the process according to the invention can be an all-solid-state multilayer battery.

In one embodiment of the battery according to the invention, said battery includes at least one encapsulation layer, preferably a ceramic or glass-ceramic layer. Advantageously, said battery includes a second encapsulation layer deposited on said first encapsulation layer, said second layer preferably being made of silicone polymer.

Advantageously, the battery includes terminals where the cathode and anode current collectors are visible. Preferably, the anode connections and cathode connections are located on opposite sides of the stack. Advantageously, the terminals are also covered with a nickel layer in contact with electrochemical cells, said nickel layer being covered with a tin layer.

Preferably, said at least one encapsulation layer covers four of the six faces of said battery, the two other battery faces being covered with terminals.

In certain embodiments, the battery capable of being obtained by the process according to the invention is entirely inorganic.

Advantageously, the battery obtained according to the invention is entirely inorganic.

DRAWINGS

FIGS. 1(a), 1(b), 1(c), 1(d), 1(e) and 1(f) show products capable of being obtained according to a plurality of embodiments according to the invention.

Figure 4:
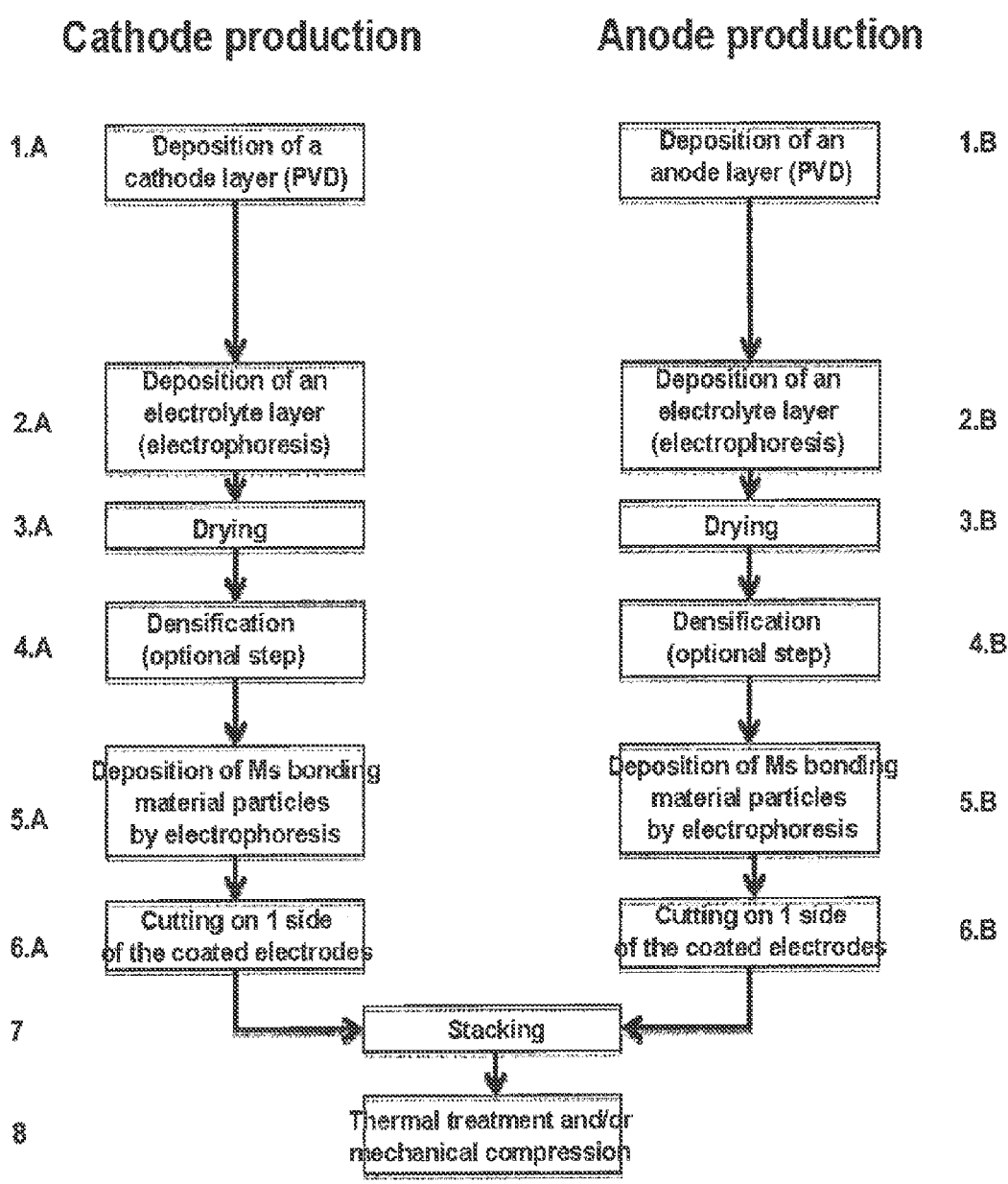
Figure 5:
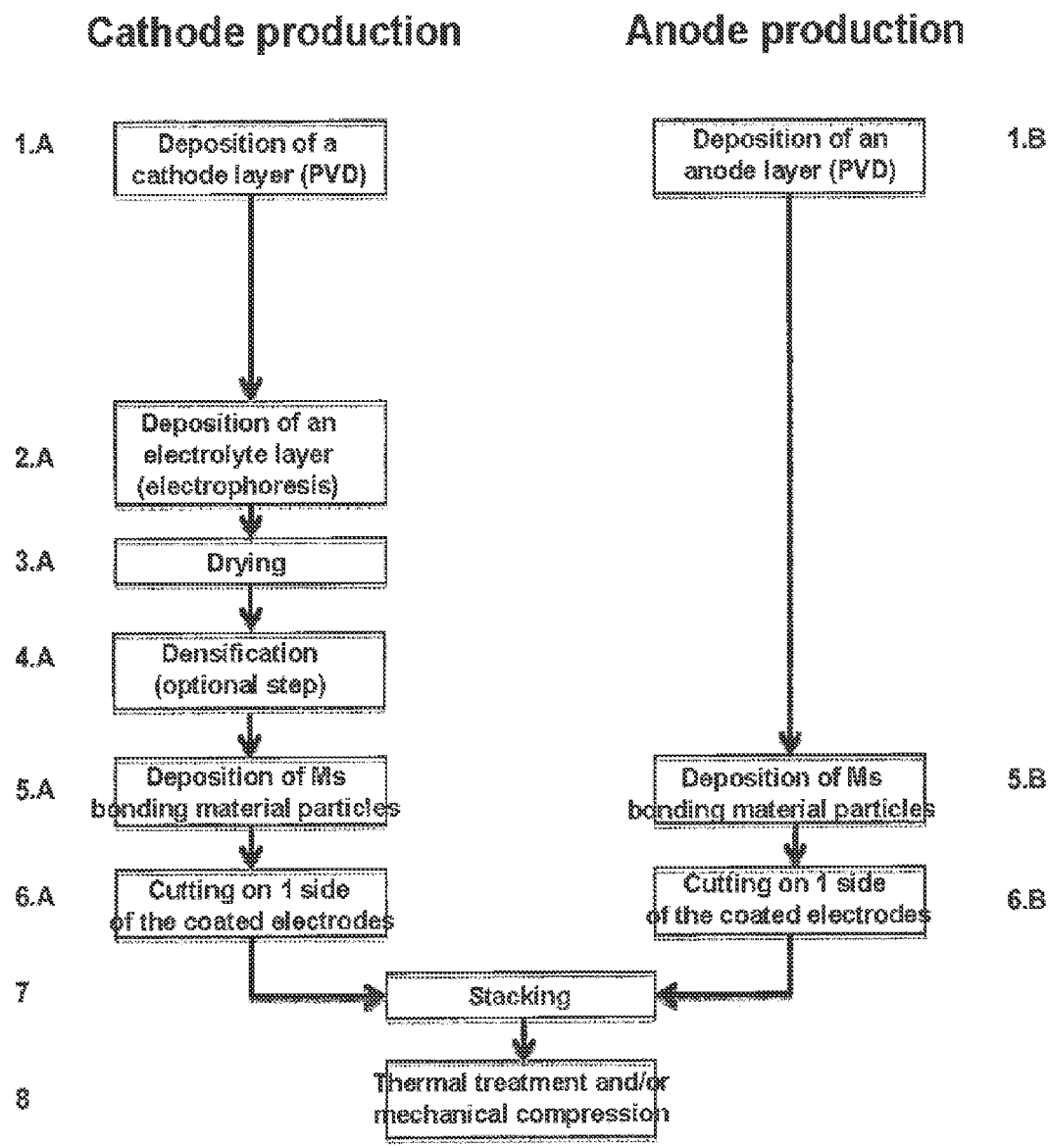

FIGS. 4 and 5 schematically show the steps for producing a battery according to two embodiments according to the invention.

Figure 6:
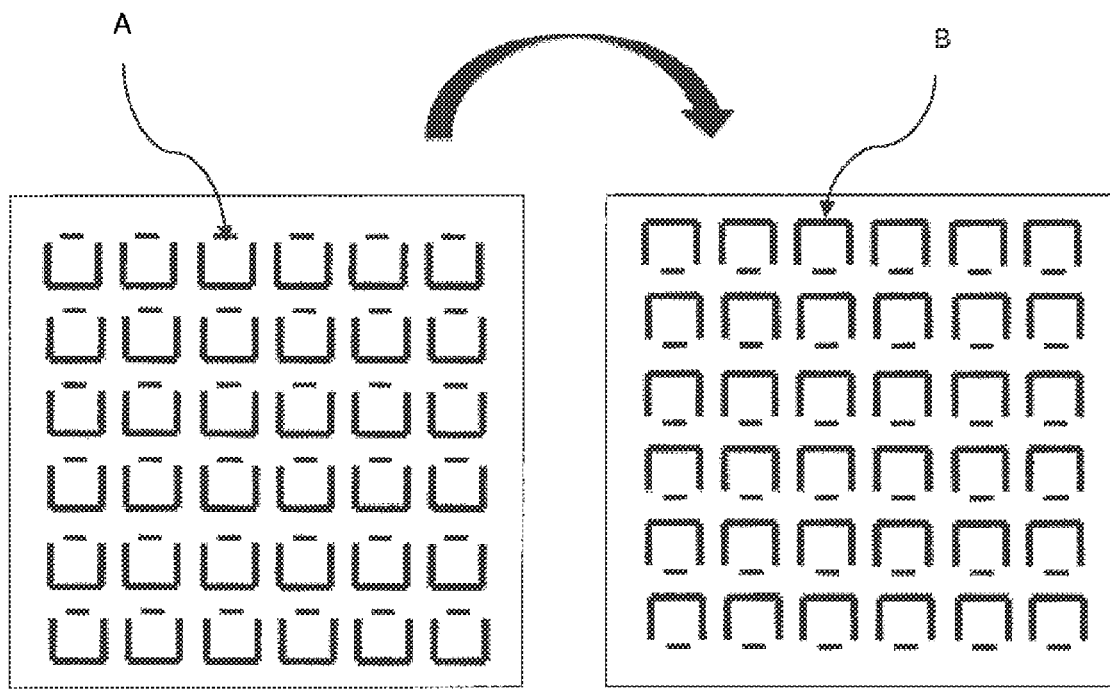

FIG. 6 schematically shows a cathode film (left-hand side of the figure) and an anode film covered with an electrolyte layer (right-hand side of the figure), the two films including patterns cut out by punching. The black arrow shows the operation of alternate stacking of cathode and anode sheets covered with electrolyte, with their cutout patterns stacked in a head-to-tail configuration. The punching may be performed on the metal substrate before the electrode layers are deposited.

Figure 7:
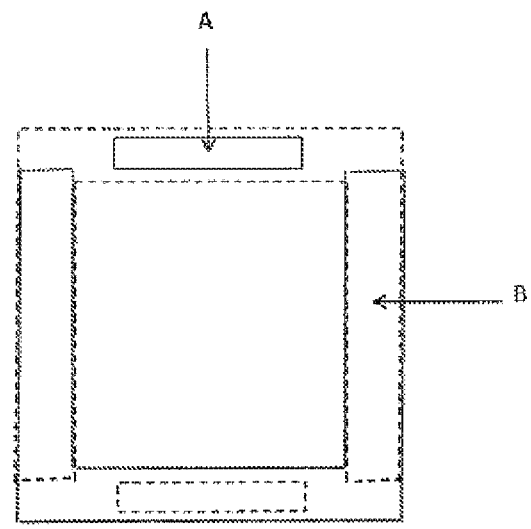

FIG. 7 schematically shows a detail of the stacking of the cathode and anode sheets covered with an electrolyte layer resulting from the stacking shown in FIG. 6.

Figure 8:
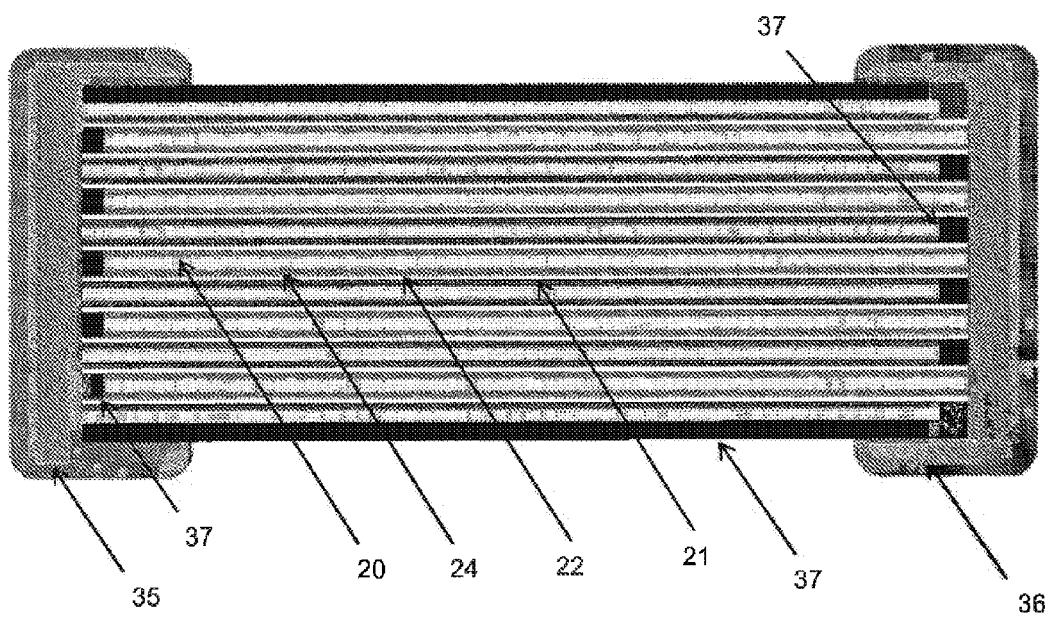

FIG. 8 shows a multilayer battery capable of being obtained by the process according to the invention, according to a particular embodiment. More specifically, the multilayer battery includes:

- a plurality of substrate layers 20 made of a metal sheet, or a metal sheet covered with a noble metal, or a polymer sheet metalized with a noble metal, or a graphite sheet covered with a noble metal;
- a plurality of solid electrolyte layers 22;
- a plurality of thin anode layers 21;
- a plurality of thin cathode layers 24;
- a plurality of Ms bonding material layers (not shown in the figure);
- at least one thin encapsulation layer 37 capable of consisting of a polymer, a ceramic or glass-ceramic, capable of being, for example, in the form of an oxide, nitride, phosphates, oxynitride or siloxane. Advantageously, this encapsulation layer includes a ceramic or glass-ceramic layer covered with an epoxy or silicone resin;
- terminals 35, 36, which make it possible to use alternately positive and negative electrical connections on each of the ends. These terminals make it possible to produce electrical connections in parallel between the different battery elements. For this, only the connections (+) emerge at one end, and the (−) are available at the other ends. Preferably, the connections (+) and (−) are laterally offset and the encapsulation serves as a dielectric substance for preventing the presence of a short-circuit on said ends. The terminals 35, 36 are shown here as a double layer but may be produced as a single layer.

DESCRIPTION

Definitions

An "all-solid-state" battery is a battery in which the electrodes and the electrolyte are solid and do not include a liquid phase, even impregnated in the solid phase.

An "all-solid-state multilayer battery" according to the invention is a one-piece battery formed by a stack of a plurality of "elementary cells". An "elementary cell" in the present invention is an electrochemical cell consisting of an anode and a cathode with insertion of lithium ions, separated by a solid electrolyte conducting lithium ions.

An "Ms bonding material" refers to any lithium ion-conducting material enabling the anode layer and the cathode layer to be assembled, in which at least one of said anode and cathode layers is covered with an electrolyte layer, thermally treated and/or mechanically compressed, in order to form, by stacking, an all-solid-state multilayer battery after a low-temperature thermal treatment and/or by mechanical compression of said stack.

In certain embodiments according to the invention "the batteries are all-inorganic, i.e. they do not include polymer in the electrodes or in the electrolyte, but may include elemental carbon (for example graphite).

In the context of this invention, a "dense" layer is a layer having a density greater than 85% of the theoretical density of the massive body, and preferably more than 90% or even 95%.

In the context of this invention, the size of a particle is its greatest dimension. Thus, a "nanoparticle" is a particle in which at least one of the dimensions is less than 100 nm. The "particle size" or "average particle size" of a powder or a group of particles is given as D50.

1. Materials for Cathode Electrolyte and Anode

According to the invention, the materials used to produce a cathode layer are preferably, but not entirely, chosen from one or more of the following materials:

(i) the oxides: $LiMn_2O_4$, $LiCoO_2$, $LiNiO_2$, $LiMn_{1.5}Ni_{0.5}O_4$, $LiMn_{1.5}Ni_{0.5-x}X_xO_4$ (where X is selected from Al, Fe, Cr, Co, Rh, Nd, other rare earth elements, and where $0<x<0.1$), $LiFeO_2$, $LiMn_{1/3}N_{1/3}Co_{1/3}O_4$;

(ii) the phosphates: $LiFePO_4$, $LiMnPO_4$, $LiCoPO_4$, $LiNiPO_4$, $Li_3V_2(PO_4)_3$; the phosphates of formula $LiMNPO_4$, with M and N (M≠N) selected from Fe, Mn, Ni, Co, V;

(iii) all of the lithiated forms of the following chalcogenides: $V_2O_5$, $V_3O_8$, $TiS_2$, $TiO_yS_z$, $WO_yS_z$, $CuS$, $CuS_2$.

According to the invention, the materials used to produce an anode layer are preferably, but not entirely, chosen from one or more of the following materials:

(i) tin oxynitrides (with a typical formula $SnO_xN_y$);

(ii) mixed silicon and tin oxynitrides (typical formula $Si_aSn_bO_yN_z$ with $a>0$, $b>0$, $a+b\leq2$, $0<y\leq4$, $0<z\leq3$) (also called SiTON), and in particular $SiSn_{0.87}O_{1.2}N_{1.72}$; as well as oxynitrides in the form $Si_aSn_bC_cO_yN_z$ with $a>0$, $b>0$, $a+b\leq2$, $0<c-10$, $0<y<24$, $0<z<17$; $Si_aSn_bC_cO_yN_zX_n$ and $Si_aSn_bO_yN_zX_n$ with $X_n$ at least one of the elements among F, Cl, Br, I, S, Se, Te, P, As, Sb, Bi, Ge, Pb.

(iii) nitrides of type $Si_xN_y$ (in particular with $x=3$ and $y=4$), $Sn_xN_y$ (in particular with $x=3$ and $y=4$), $Zn_xN_y$ (particular with $x=3$ and $y=4$), $Li_{3-X}M_XN$ (with M=Co, Ni, Cu);

(iv) oxides $SnO_2$, $Li_4Ti_5O_{12}$, $SnB_{0.6}P_{0.4}O_{2.9}$.

The anode layer may also be produced by any material in which the lithium insertion potential is less than the insertion potential of the material used to produce the cathode layer.

For example, LiFePO4 may be used as the anode material when LiMn1.5N0.5O4 is used as the cathode material.

Li4Ti5O12 nanoparticles for producing an anode layer are more specifically preferred.

To produce the anode or the cathode, it is possible to add, to the aforementioned materials, electrically conductive materials, and in particular graphite, and/or nanoparticles of lithium ion conducting materials, of the type used to produce electrolyte layers. In fact, certain electrode materials are poor ionic and electric conductors. Consequently, when they are deposited with thicknesses greater than 1 µm, the electrode may be too resistive. Thicknesses of 1 to 10 µm are generally desirable for electrodes in order to have batteries with good energy densities. In this case, it is necessary to produce a co-deposit of electrode material particles and conductive (ionic and/or electric) particles.

The electrolyte must be a good ionic conductor but also an electrical insulator. According to the invention, the nanoparticles used to produce an electrolyte layer are preferably chosen from one or more of the following materials:

a) oxide-based materials chosen from Li3.6Ge0.6V0.4O4; Li2O—Nb2O5; LiSiO4; Li2O; Li14Zn (GeO4)4; Li6Zr2O7; Li8ZrO6; Li0.35La0.55TiO3; Li0.5La0.5TiO3; Li7La3Zr2O12; Li5+xLa3(Zrx,A2-x)O12 with A=Sc, Ti, V, Y, Nb, Hf, Ta, Al, Si, Ga, Ge, Sn and 1.4≤x≤2;

b) nitride- or oxynitride-based materials chosen from Li3N; Li3PO4-xN2x/3, Li4SiO4-xN2x/3, Li4GeO4-xN2x/3 with 0<x 4 or Li3BO3-xN2x/3 with 0<x<3; lithium and phosphorus oxynitride-based materials (called LiPON) that may also contain silicon (called LiSiPON), boron (called LiPONB), sulfur (called LiPONS), zirconium or aluminum (called LiPAON) or a combination of aluminum, boron, sulfur and/or silicon; the lithium and boron oxynitride-based materials (called LiBON) that may also contain silicon (called LiSiBON), sulfur (called (LIBONS) or aluminum (called LiBAON) or a combination of aluminum, sulfur and silicon; and more specifically materials of the LixPOyNz type with x~2.8 and 2y=3z with 0.16≤z≤0.46; or LiwPOxNySz with (2x+3y+2z)=(5+w) and 3.2≤x≤3.8; 0.13≤y≤0.4; 0≤z≤0.2; 2.9≤w≤3.3; or LitPxAlyOuNvSw with (5x+3y)=5; (2u+3v+2w)=(5+t); 2.9≤t 3.3; 0.84≤x≤0.94; 0.094≤y≤0.26; 3.2≤u≤3.8; 0.13≤v≤0.46; 0≤w≤0.2; or Li1.9Si0.2P1.0O1.1N1.0; or Li2.9PO3.3N0.46; or Li6-0.75xP1.75xZr2-2xO7-yNz with z≤14/3; 2y=3z and x≤0.8; or Li8-3.5xP1.5xZr1-xOz6-yNz with x≤0.8; z≤4 and 2y=3z; or Li8-3xLaxZrO6-yNz with O<x≤2; z≤4 and 2y=3z; or Li3(Sc2-xMx)(PO4-yNz) with x≤2; z≤8/3; 2y=3z and M=Al, Y or Al1-aYa with a≤1;

c) sulfide-based materials chosen from: LixM1-yM'yS4 with M=Si, Ge, Sn and M'=P, Al, Zn, Ga, Sb; Li2S; B2S3; P2S5; 70Li2S-30P2S5; Li7P3S11; Li10GeP2S12; Li7PS6; Li3.25Ge0.25P0.75S4; Li10MP2S12 with M=Si, Ge, Sn and mixtures between Li2S and one of the compounds among P2S5, GeS2, Ga2S3 or SiS2;

d) phosphate or borate-based materials chosen from Li3PO4; LiTi(PO4)3; Li1+xAlxM2-x(PO4)3 (where M=Ge, Ti, and/or Hf and 0<x 1); Li1.3Al0.3Ti1.7(PO4)3; Li1+x+yAlxTi2-xSiyP3-yO12 (where 0≤x≤1 and 0≤y≤1); Li1+x+zMx (Ge1-yTiy)2-xSizP3-zO12 (where 0≤x≤0.8, 0≤y≤1.0, 0≤z≤0.6); 2(Li1.4Ti2Si0.4P2.6O12)-AlPO4; LixAlz-yGaySw(PO4)c or LixAlz- yGaySw(BO3)c or LixGez- ySiySw(PO4)c or LixGez- ySiySw(BO3)c or more generally LixMz- yM'ySw(PO4)c or LixMz-yM'ySw(BO3)c with 4<w<20, 3<x<10, 0≤y≤1, 1≤z≤4 and 0<c<20 and M or M' an element among Al, Si, Ge, Ga, P, Zn, Sb; or Li3Sc2-xMxPO4 with M=Al, Y or Al1-aYa with a<1;

e) mixed materials chosen from the mixtures between Li2S and one of the compounds among Li3PO4, Li3PO4-xN2x/3, Li4SiO4-xN2x/3, Li4GeO4-xN2x/3 with 0<x<4 or Li3BO3-xN2x/3 with 0<x<3; the mixtures between Li2S and/or B2S3 SiS2, P2S5, GeS2, Ga2S3 and a compound of the LiaMOb type, which may be a lithium silicate Li4SiO4, a lithium borate Li3BO3 or a lithium phosphate $Li_3PO_4$.

2. Deposition of Anode, Cathode and Solid Electrolyte Layers

According to the invention, the layers of anode, cathode and electrolyte materials may be obtained by at least one of the deposition techniques described below.

The vacuum deposition techniques make it possible to obtain extremely dense layers directly on metal substrates capable of acting as an anode and cathode current collector. Among the known vacuum deposition techniques, it is possible to cite physical vapor deposition (PVD) techniques, and more specifically vacuum evaporation, laser ablation, ion beam or cathode sputtering; chemical vapor deposition (CVD) techniques, and more specifically plasma-enhanced chemical vapor deposition (PECVD), laser-assisted chemical vapor deposition (LACVD), or aerosol-assisted chemical vapor deposition (AA-CVD) techniques. These deposition techniques make it possible to produce electrodes (cathode/anode) with an excellent level of purity. To ensure good operation of the electrodes, the deposited layers must be thin, preferably less than 10 µm, more preferably 5 µm so as not to induce resistive effects according to the materials used in order to produce the anode and cathode layers. In addition, for thicknesses greater than 5 µm, the risk is that of developing column growth, which leads to a less regular interface.

Electrospraying deposition techniques may also advantageously be used to produce a deposition of a dense layer containing electrode (anode/cathode) and/or electrolyte materials. These layers are produced by spraying chemical compounds reacting under the influence of an electric field forming, at the surface, a thin film of electrode and/or electrolyte materials after drying. An example of the production of such a layer is provided in the article "The production of thin film of LiMn2O4 by electrospraying", J. of Aerosol Science, Vol. 25, no. 6, p. 1229-1235.

Dense layer deposits containing electrode (anode/cathode) and/or electrolyte materials may also be produced by the "aerosol" deposition technique. The Ms material nanoparticles contained in a tank are moved by injecting a pressurized gas into the container. A deagglomeration device may be installed on the particle jet so as to break up the agglomerates and ensure a flow of particles of controlled sizes. Using this deposition technique, it is possible to produce layers having highly variable thicknesses. In addition, this deposition technique makes it possible to jointly deposit particles of active materials and ion and/or electron-conducting materials. The density of the layer deposited by this technique is dependent upon the size of the particles, their refractory character and the speed of projection of the particles. In addition, this deposition technique may be performed at low temperature and makes it possible to produce dense anode and cathode layers directly on metal substrates, and more specifically aluminum, copper or nickel metal substrates.

The sol-gel deposition techniques may be used to produce compact deposits of layers containing electrode (anode/cathode) and/or electrolyte materials.

This technique is especially advantageous for producing thin layers with a thickness of less than 100 nm, preferably less than 50 nm, and even more preferably less than 30 nm.

In addition, it is possible to use this technique to deposit thicker layers, i.e. between 0.1 and 10 µm. It is then necessary to perform the deposition in a plurality of successive steps by depositing layers one after another (a "layer-by-layer" growth technique) so as to prevent the formation of cracking of the deposited layers when the latter exceed a critical thickness. An example of the production of electrodes by this technique is described in the article "Preparation of Li4Ti5O12 and LiCoO2 thin film electrodes from precursors obtained by sol-gel", Y. H. Rho, K. Kanamura, Solid State Ionics 151 (2002) 151-157. However, the sol-gel technique is not suitable for the deposition of layers containing cathode materials or anode materials on metal substrates having a low melting point, for example aluminum, in particular when said deposits require thermal treatments at a temperature above 600° C.

It is also possible to obtain dense electrode and/or electrolyte layers by producing a suspension of electrode and/or electrolyte material nanoparticles. There are a number of techniques making it possible to deposit nanoparticles on a surface to be coated. Among these techniques, it is possible to cite, in particular, the techniques of inking, dip-coating, spin-coating, and the Langmuir-Blodgett process. The nanoparticles of materials to be deposited are first suspended in a solvent that will then be evaporated. To obtain dense electrode and/or electrolyte layers, it is then necessary to deposit, dry and consolidate the deposits layer-by-layer. In order for such a process to be capable of working, it is necessary for the nanoparticle deposit to be compact enough for them to be capable of bonding with one another during the drying step (and/or the step of thermal consolidation treatment if necessary). Once the nanoparticles have been deposited in the form of layers, then dried, a thermal and/or mechanical treatment is performed in order to assemble the nanoparticles with one another. When the nanoparticle deposit is produced on a metal substrate, uniaxial pressure (with or without heating) is advantageously applied on the deposit so as to prevent lateral shrinkage during the consolidation step. In addition, this technique makes it possible to produce composite deposits containing active materials, lithium ion-conducting materials and/or electron-conducting materials so as to increase the thickness of the electrode layers without altering their conduction (ionic and/or electrical) properties.

The electrophoretic deposition technique also makes it possible to obtain dense layers of electrode and/or electrolyte materials. When the size of the particles to be deposited is less than 100 nm, preferably less than 50 nm, and even more preferably less than 30 nm, it is possible to obtain dense layers by electrophoresis directly on the metal conductive substrates, with a density greater than 50% of the theoretical density of the massive body. To prevent cracking of the layers after deposition, the suspended nanoparticles must be small and perfectly stable. According to the properties of the deposited nanoparticles, the compactness, the thickness of the layers, an additional thermal and/or mechanical treatment may be performed in order to density the deposits of said layers. This may lead to densities greater than 85% or even 90% of the theoretical density of the massive body.

When the particle suspensions are less stable, the deposition by electrophoresis may advantageously be performed in successive steps. In fact, according to the thickness of the deposited layer, the risk of appearance of cracks in the drying step is significant. It is thus possible to produce the deposits with a thickness greater than 0.5 µm without cracks, by deposition and consolidation of successive layers. For example, a thick dense layer may be obtained by performing the following steps:

a) a mixture of particles of anode or cathode materials, electron-conducting materials and lithium ion-conducting materials is deposited by electrophoresis on 0.4 µm of thickness (fine enough not to produce cracks);

b) the deposit is dried by heating, lyophilization or immersion of the deposit in $CO_2$ in the supercritical state;

c) optionally, a uniaxial mechanical compression of the deposit is performed, preferably with heating;

d) steps a), b) and c) are performed again until a layer with the desired thickness is produced.

This technique has the advantage of producing thick, dense layers. In addition, this technique makes it possible to produce composite deposits containing active materials, ion- and/or electron-conducting materials, which makes it possible to preserve good conduction properties of the electrodes, even when the latter are thick. In addition, this technique may be implemented directly on metal conducting substrates and makes it possible to produce dense anode, cathode and/or electrolyte layers. In addition, according to the size of the particles of the deposited materials, the thermal treatment and mechanical compression may be variable. For the deposition by electrophoresis of a suspension of nanoparticles having a size smaller than 100 nm, preferably smaller than 50 nm, and even more preferably smaller than 30 nm, the layers obtained may be dense directly after deposition, in particular when the deposited materials are non-refractory and have a high surface energy. However, for particles larger than 100 nm, the application of uniaxial mechanical compression and/or a thermal treatment may be performed in order to densify the layer. This technique then makes it possible to quickly produce relatively thick deposits, and is therefore especially suitable for producing thick electrodes for batteries having high energy densities.

The substrate may be a sheet or a strip having a conductive surface or conductive elements, for example conductive zones. The nature of the substrate in contact with the electrodes must be inert and must not interfere and lead to parasitic reactions in the potential range of operation of the Li-ion battery. As an example, a copper, aluminum or nickel strip, having a thickness that may be, for example 6 µm, may be used, or a polymer strip having an electrically conductive surface deposit (also called a metalized polymer film here).

Figure 3:
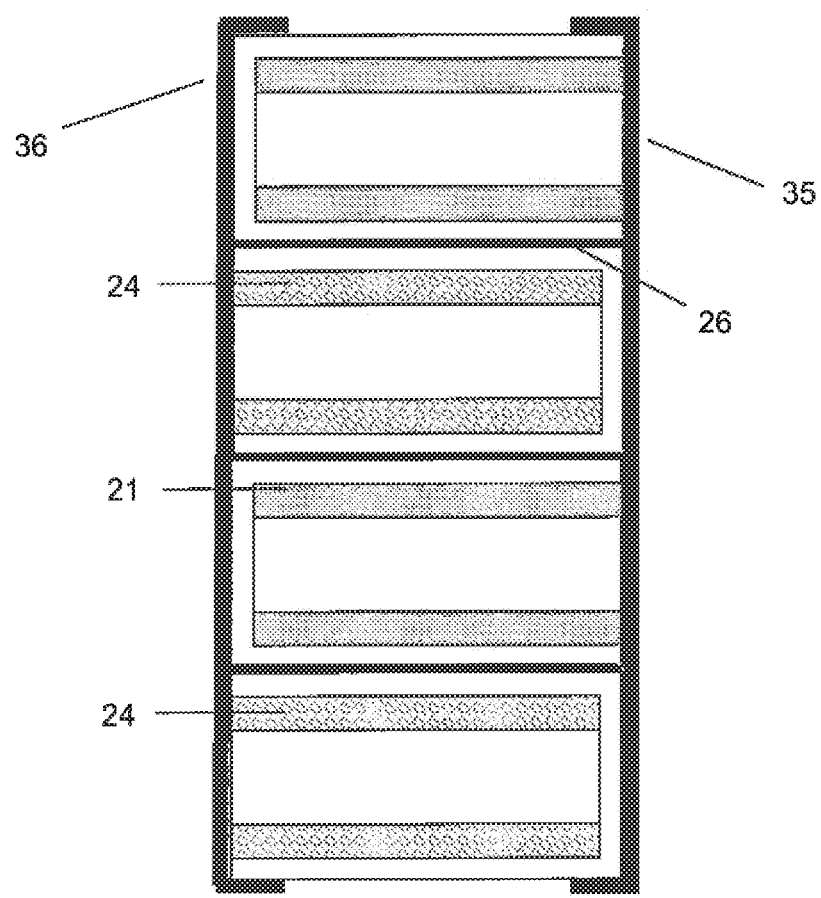
FIG. 3 show a battery capable of being obtained according to an embodiment of the deposition process of the invention.

In the context of this invention, the substrate must have a low thickness so that fine cutouts of the electrodes can be produced, as better shown in FIGS. 3 and 10. Metal and/or metalized polymer films are preferred. The pattern of the electrode sheets may be produced before the electrodes are deposited. This pattern may be produced by any process known for this purpose, i.e. any mechanical, chemical or electrochemical process.

The advantage of the process according to the invention is that it makes it possible to produce "all-solid-state" multilayer structures at low temperature. Thus, substrates based on metalized polymer films may also advantageously be used. Such films may be produced industrially with thicknesses on the order of 1 µm, which makes it possible to increase the volume energy density of the thin-film batteries.

Advantageously, to improve the quality of the electric contacts and prevent the appearance of parasitic reactions with the electrode materials, coated current collector surfaces are coated with noble metals and transition metals by metallization. Preferably, the metals capable of being deposited at the surface of the current collectors are selected from the following metals: gold, platinum, palladium, vanadium, cobalt, nickel, manganese, niobium, tantalum, chromium, molybdenum, titanium, palladium, zirconium, tungsten or any alloy containing at least one of these metals. Alternatively, conductive oxide films such as indium-tin oxide (ITO) may be used as a coated on the substrate in order to improve the qualities of the contact between the substrates and the electrodes.

Preferably, these coatings must remain thin and their thickness must not be greater than 500 nm, and preferably the thicknesses of the surface metallization layers will be on the order of 100 nm. These metallization layers may be produced on films, thin metal strips, for example of aluminum, copper or nickel. Preferably, the thickness of these strips is less than 20 µm, more preferably less than 10 µm, and even more preferably less than or equal to 5 µm.

The metalized polymer films must also have low thicknesses, preferably below 5 µm, and more preferably on the order of 1 µm. The nature of the metallization layers is described above, and the films may be made of polyethylene naphthalate (PEN), polyethylene terephthalate (PET), polypropylene (PP), or Teflon® (PTFE), polyimide (PI) and more specifically Kapton® for the processes requiring heat treatments of 300° C.

Preferably, the roughness of the substrates does not exceed 10% of the thickness of the deposited electrode in order to ensure optimal contact between the battery elements and ensure homogeneity of the electrode properties.

The substrate may be prepared, for example, as follows: an aluminum strip having a thickness of between 5 and 20 µm, and preferably on the order of 15 µm, is provided. The strip is then positioned so as to be kept "flat". The surface of the aluminum strip is preferably cleaned, for example by immersion in a cleaning bath. This cleaning may, for example, be performed by immersions in an NGL technology detergent bath under ultrasound, followed by rinsing with distilled water. Advantageously, the strip is treated by electropolishing in order to reduce its thickness, and/or remove surface roughnesses and microroughnesses. This electropolishing treatment may be performed in a solution having the following chemical composition: 80% absolute ethanol, 13.8% distilled water, 6.2% perchloric acid at 70%. The voltage applied is on the order of 15V. If necessary, the treatment bath may be cooled in order to prevent heating associated with the high current densities.

For a better surface quality, other bath formulations may be used, such as, for example, baths based on EPS 1250 or EPS 1300 solutions of EP Systems.

After the electropolishing treatment, the surface is rinsed with distilled water. The thickness of the strip after this treatment is generally between 1 and 10 µm.

In another embodiment, the reduction in thickness of the strip and/or the removal of surface roughnesses and microroughnesses are performed by electrochemical deposition of metal films, and more specifically metal films of aluminum, nickel or copper.

This strip is advantageously used as an anode substrate and as a cathode substrate in the process according to the invention.

Advantageously, a nickel plating treatment may be performed directly on the surface of the aluminum strip just after the electropolishing treatment thereof. This treatment may be performed in different ways, by electrochemical deposition, by immersion in a solution containing nickel salts, or both in succession. As an example, the electrolytic deposition may be performed in a bath with the following composition: nickel sulfamate at 300 g/l, H3BO3 at 30 g/l, NiCl2 at 30 g/l. The nickel plating is performed on the aluminum strip, the surface of which has been pre-activated by electropolishing under a current density on the order of 2 A/dm2, using a nickel counter-electrode. This nickel plating treatment makes it possible to prevent the formation of an oxide layer at the surface of the aluminum, and to improve the quality of the electrical contacts and the adhesion of the deposits.

The aforementioned treatment may be performed with other metals capable of being deposited on the surface of the aluminum strip, as described above, i.e. gold, platinum, palladium, vanadium, cobalt, manganese, niobium, tantalum, chromium, molybdenum, titanium, palladium, zirconium, tungsten, nickel or any alloy including at least one of these metals. The deposition may be performed by techniques well known to a person skilled in the art, and in particular by chemical vapor deposition, or physical deposition, in particular by evaporation and/or physical vapor deposition.

3. Deposition of an Ms Bonding Material Layer

The inventors have observed that the assembly of layers with one another may be difficult and it is thus necessary to supply (thermally and/or mechanically) a large amount of energy in order to bond them. The use of high temperatures to assemble layers is very disadvantageous because they layers may be oxidized, problems of inter-diffusion in the layers may occur and collectors may be significantly deteriorated.

According to an essential aspect of this invention, to facilitate the stacking of layers, before said stacking step, an Ms bonding material layer is deposited:
  directly on the face of the anode or cathode layer obtained in step a) of the process according to the invention; or
  on the face of the anode and/or cathode layer coated with an electrolyte layer obtained in step b) of the process according to the invention; or
  on the face of the anode layer coated with an electrolyte layer (obtained in step b)) and on the face of the cathode layer (obtained in step a)); or on the face of the anode layer (obtained in step a)) and on the face of the cathode layer (obtained in step b)).

The Ms bonding material layer must be, like the electrolyte, a good lithium ion conductor.

The melting point of the bonding material layer as deposited must be lower than that of the layers with which it is in contact. This may result from the choice of Ms material, but also the form thereof in the layer. In particular, it is known that the melting point of a material in the form of nanoparticles is lower than the melting point of dense material, which is associated with the high surface energy of the nanoparticles.

In an advantageous embodiment, the Ms bonding material is deposited in the form of a layer comprised of nanoparticles, and/or in the form of a very thin layer (for example having a thickness of less than 50 nm or 20 nm) so as to reduce the temperature of the thermal treatment performed in step e). It is then possible to stack, face-to-face, two dense layers by depositing an Ms bonding material layer on at least one of said two dense layers, the temperature of the thermal treatment TR of step d) enabling said two dense layers to be bonded, if performed, being lower than the melting temperature of the material(s) forming the dense layers.

In one embodiment, which shows the possibility of the process according to the invention for producing a mechanical stack of two identical materials, as the Ms bonding material, a thin layer of nanometric particles of electrolyte material is deposited on a densified electrolyte layer, then, on said thin bonding material layer, a second densified electrolyte layer is stacked (typically by mechanical means), and the assembly is subjected to a thermal treatment and/or mechanical densification treatment, during which the bonding material will ensure the bonding between the two electrolyte layers. This bonding probably occurs by a mechanism of diffusion or migration of more fusible bonding material, in the direction of the less fusible but chemically identical layers with which it is in contact.

In general, to assemble, by stacking, said layers obtained by the process according to the invention, the Ms bonding material is chosen from one or more of the following materials:

a) oxide-based materials chosen from $Li_{3.6}Ge_{0.6}V_{0.4}O_4$; $Li_2O-Nb_2O_5$; $LiSiO_4$; $Li_2O$; $Li_{14}Zn(GeO_4)_4$; $Li_6Zr_2O_7$; $Li_8ZrO_6$; $Li_{0.35}La_{0.55}TiO_3$; $Li_{0.5}La_{0.5}TiO_3$; $Li_7La_3Zr_2O_{12}$; $Li_{5+x}La_3(Zr_x,A_{2-x})O_{12}$ with A=Sc, Ti, V, Y, Nb, Hf, Ta, Al, Si, Ga, Ge, Sn and $1.4 \leq x \leq 2$;

b) nitride- or oxynitride-based materials chosen from $Li_3N$; $Li_3PO_4-xN_{2x/3}$, $Li_4SiO_4-xN_{2x/3}$, $Li_4GeO_4-xN_{2x/3}$ with $0<x$ 4 or $Li_3BO_3-xN_{2x/3}$ with $0<x<3$; lithium and phosphorus oxynitride-based materials (called LiPON) that may also contain silicon (called LiSiPON), boron (called LiPONB), sulfur (called LiPONS), zirconium or aluminum (called LiPAON) or a combination of aluminum, boron, sulfur and/or silicon; the lithium and boron oxynitride-based materials (called LiBON) that may also contain silicon (called LiSiBON), sulfur (called (LIBONS) or aluminum (called LiBAON) or a combination of aluminum, sulfur and silicon; and more specifically materials of the $Li_xPO_yN_z$ type with $x\sim2.8$ and $2y=3z$ with $0.16 \leq z \leq 0.46$; or $Li_wPO_x-N_yS_z$ with $(2x+3y+2z)=(5+w)$ and $3.2 \leq x \leq 3.8$; $0.13 \leq y \leq 0.4$; $0 \leq z \leq 0.2$; $2.9 \leq w \leq 3.3$; or $Li_tP_xAl_yO_uN_vS_w$ with $(5x+3y)=5$; $(2u+3v+2w)=(5+t)$; $2.9 \leq t$ $3.3$; $0.84 \leq x \leq 0.94$; $0.094 \leq y \leq 0.26$; $3.2 \leq u \leq 3.8$; $0.13 \leq v \leq 0.46$; $0 \leq w \leq 0.2$; or $Li1.9Si0.2P1.0O1.1N1.0$; or $Li2.9PO3.3N0.46$; or $Li6-0.75xP1.75xZr2-2xO7-yNz$ with $z \leq 14/3$; $2y=3z$ and $x \leq 0.8$; or $Li8-3.5xP1.5xZr1-xOz6-yNz$ with $x \leq 0.8$; $z \leq 4$ and $2y=3z$; or $Li8-3xLaxZrO6-yNz$ with $O<x \leq 2$; $z \leq 4$ and $2y=3z$; or $Li3(Sc2-xMx)(PO4-yNz)$ with $x \leq 2$; $z \leq 8/3$; $2y=3z$ and M=Al, Y or Al1-aYa with $a<1$;

c) sulfide-based materials chosen from: $Li_xM1-yM'yS4$ with M=Si, Ge, Sn and M'=P, Al, Zn, Ga, Sb; $Li_2S$; $B_2S_3$; $P_2S_5$; $70Li_2S-30P_2S_5$; $Li_7P_3S_{11}$; $Li_{10}GeP_2S_{12}$; $Li_7PS_6$; $Li3.25Ge0.25P0.75S4$; $Li_{10}MP_2S_{12}$ with M=Si, Ge, Sn and mixtures between $Li_2S$ and one of the compounds among $P_2S_5$, $GeS_2$, $Ga_2S_3$ or $SiS_2$;

d) phosphate or borate-based materials chosen from $Li_3PO_4$; $LiTi(PO_4)_3$; $Li1+xAlxM2-x(PO4)3$ (where M=Ge, Ti, and/or Hf and $0<x$ 1); $Li1.3Al0.3Ti1.7(PO4)3$; $Li1+x+yAlxTi2-xSiyP3-yO12$ (where $0 \leq x \leq 1$ and $0 \leq y \leq 1$); $Li1+x+zMx (Ge1-yTiy)2-xSizP3-zO12$ (where $0 \leq x \leq 0.8$, $0 \leq y \leq 1.0$, $0 \leq z \leq 0.6$); $2(Li1.4Ti2Si0.4P2.6O12)-AlPO4$; $LixAlz-yGaySw(PO4)c$ or $LixAlz-yGaySw(BO3)c$ or $LixGez-ySiySw(PO4)c$ or $LixGez-ySiySw(BO3)c$ or more generally $LixMz-yM'ySw(PO4)c$ or $LixMz-yM'ySw(BO3)c$ with $4<w<20$, $3<x<10$, $0 \leq y \leq 1$, $1 \leq z \leq 4$ and $0<c<20$ and M or M' an element among Al, Si, Ge, Ga, P, Zn, Sb; or $Li3Sc2-xMxPO4$ with M=Al, Y or Al1-aYa with $a<1$;

e) mixed materials chosen from the mixtures between $Li_2S$ and one of the compounds among $Li_3PO_4$, $Li_3PO_4-xN_{2x/3}$, $Li_4SiO_4-xN_{2x/3}$, $Li_4GeO_4-xN_{2x/3}$ with $0<x<4$ or $Li_3BO_3-xN_{2x/3}$ with $0<x<3$; the mixtures between $Li_2S$ and/or $B_2S_3$ $SiS_2$, $P_2S_5$, $GeS_2$, $Ga_2S_3$ and a compound of the $Li_aMO_b$ type, which may be a lithium silicate $Li_4SiO_4$, a lithium borate $Li_3BO_3$ or a lithium phosphate $Li_3PO_4$.

The deposition of the Ms bonding material layer may be performed by one of the following techniques, with the understanding that the depositions of the layers of step a), b) and c) of the process according to the invention are not all performed by electrophoresis:

i) physical vapor deposition (PVD), and more specifically vacuum evaporation, laser ablation, ion beam, cathode sputtering;

ii) chemical vapor deposition (CVD) and more specifically plasma-enhanced chemical vapor deposition (PECVD), laser-assisted chemical vapor deposition (LACVD), or aerosol-assisted chemical vapor deposition (AA-CVD);

iii) electrospraying;

iv) aerosol deposition;

v) electrophoresis;

vi) sol-gel;

vii) dipping, more specifically dip-coating, spin-coating or the Langmuir-Blodgett process.

To guarantee good electrode performance, these deposits must be thin, preferably less than 200 nm, and even more preferably less than 100 nm so as not to produce excessive resistive effects in the battery cell.

The sol-gel deposition techniques make it possible to produce a compact deposit of "Ms" bonding material. This technique is very suitable for the production of layers having a thickness of less than 200 nm.

It is also possible to deposit an Ms bonding material layer using a suspension previously containing nanoparticles of Ms bonding material in a suitable liquid that will then be evaporated. It more specifically involves inking, dipping, spin-coating or Langmuir-Blodgett techniques.

Electrospraying deposition techniques may also be used to produce deposits of Ms bonding material in the form of nanoparticles. This deposition is performed by spraying chemical compounds reacting under the influence of the electric field to form, at the surface, an Ms bonding material layer after drying (cf. point 2.2 of this description).

In another embodiment, the deposition of nanoparticles of Ms bonding material may be performed by the "aerosol" deposition technique. The Ms material nanoparticles contained in a tank are moved by injecting a pressurized gas into the container. A deagglomeration device may be installed on the particle jet in order to break up the agglomerates and ensure a flow of particles of controlled sizes (cf. point 2.2 of this description).

Finally, the electrophoresis deposition technique makes it possible to obtain a thin Ms bonding material layer.

After the deposition of the Ms material layer on the face of at least one of the layers obtained by electrophoresis, said layers are stacked face-to-face, then mechanically compressed and/or thermally treated in order to obtain an all-solid-state assembly of elementary cells capable of functioning as a battery. Preferably, the thermal treatment of the layers to be assembled is performed at a temperature TR which, preferably, does not exceed 0.7 times the melting or decomposition temperature (expressed in ° C.), and more preferably does not exceed 0.5 times (and even more preferably does not exceed 0.3 times) the melting or decomposition temperature (expressed in ° C.) of the Ms bonding material.

The thermal treatment takes place at a relatively low temperature (TR), which is dependent upon the melting point of the material, the nanoparticle size and the intensity of the mechanical treatment. TR advantageously does not go beyond 600° C., and preferably does not go beyond 500° C. or even 400° C. The thermal treatment is advantageously performed under vacuum, so as to minimize the pollution of the surface of the deposited particles, or under inert gas.

Advantageously, the mechanical compression of the layers to be assembled is performed at a pressure of between 10 and 100 MPa, preferably between 10 and 50 MPa.

The total thickness of the Ms bonding material layer is also dependent upon the nature of the layers to be assembled. For example, if one wants to assemble the cathode layer and an anode layer each coated with a solid electrolyte layer, the thickness of the Ms bonding material layer must be very low, i.e. below 100 nm, preferably below 50 nm and even more preferably below 30 nm, in order for the electrolyte obtained to remain a good ionic conductor. Finally, if one wants to assemble an anode layer (or a cathode layer) not coated with an electrolyte layer and a cathode layer (or an anode layer) coated with an electrolyte layer, the thickness of the Ms bonding material layer is below 100 nm, preferably below 50 nm and even more preferably below 30 nm. Advantageously, the size of the Ms material particles is smaller than the thickness of the layer on which the Ms material is deposited.

We will now describe several advantageous embodiments for selecting and depositing the Ms bonding material. The bonding material is inorganic, and in this case it is advantageously deposited from nanoparticles, the film deposited from nanoparticles advantageously being subjected to a thermal and/or mechanical densification process; the fact that it is deposited in the form of nanoparticles reduces its melting point with respect to a massive phase. Finally, certain phosphates and borates have a relatively low melting point and do not need to be deposited in the form of nanoparticles in order to be fusible and to promote contact between the two layers stacked face-to-face.

4. Assembly of a Battery

FIGS. 4 and 5 schematically show the steps of production of a battery according to different embodiments of the process according to the invention. These embodiments are in no way limiting but are provided as an illustration.

Figure 1A:
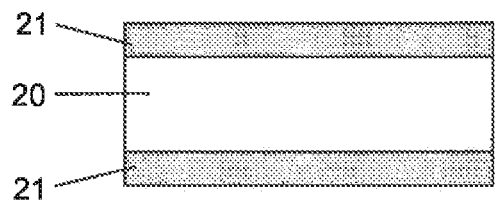

The product obtained in each step is shown schematically in FIGS. 1a to 1d according to the embodiment of the invention schematically shown in FIG. 4. In steps 1.A and 1.B (FIGS. 4 and 5) a cathode 24 and anode 21 layer, respectively, is deposited by physical vapor deposition (PVD) on the conductive substrate 20. As shown in FIG. 1a for the anode 21, this deposition can be performed on the two faces of the conductive substrate.

In steps 2.A and 2.B, an electrolyte layer 22 is deposited on the anode 21 and the cathode 24, respectively (FIG. 4). Its thickness is preferably less than 1 μm.

Figure 1B:
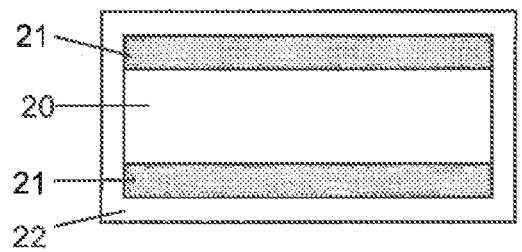
Figure 1C:
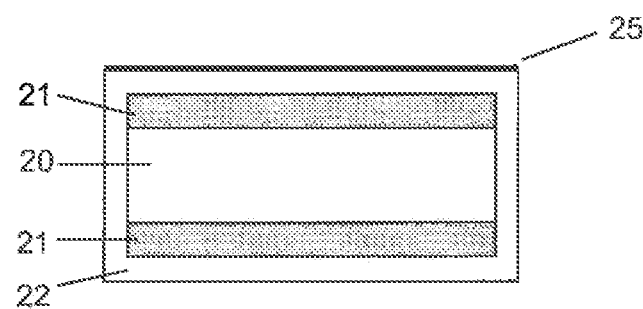

This deposit also covers the edges of the electrodes, as schematically shown in FIG. 1b. This insulation of the electrode edges prevents both the risk of short-circuit and the risk of current leakages. In steps 3.A and 3.B, this electrolyte deposit is dried.

In a specific embodiment of the invention, the deposit is densified in steps 4.A and 4.B by mechanical and/or thermal means. This step is not necessary when the electrolyte layer obtained is dense and compact after the drying step.

In another embodiment, as shown in FIG. 5, the electrolyte layer 22 is deposited only on the cathode 24. Its thickness is preferably below 1 μm. This deposit also covers the edges of the electrodes, as schematically shown in FIG. 1b. This insulation of the electrode edges prevents both the risk of short-circuit and the risk of current leakages. It also enables the encapsulation to be simplified. Certain lithium ion-conducting ceramics and/or glass-ceramics may also protect the cell from the external environment. A single encapsulation layer in the form of a polymer or silicone may then be used to protect the battery cell. In step 3.A, said electrolyte deposit is dried.

In steps 5.A and 5.B (FIGS. 4 and 5), an Ms bonding material layer is deposited on the face of at least one of the two layers obtained by electrophoretic deposition, and which will be stacked face-to-face.

Figure 1D:
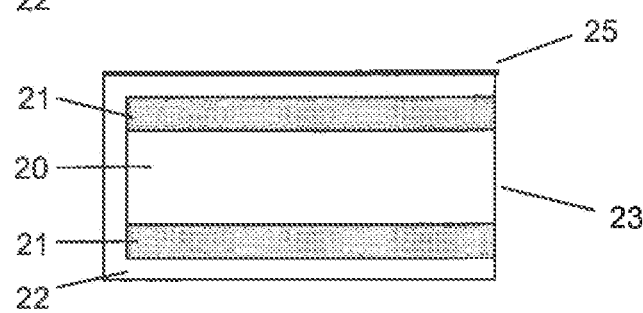
Figure 1E:
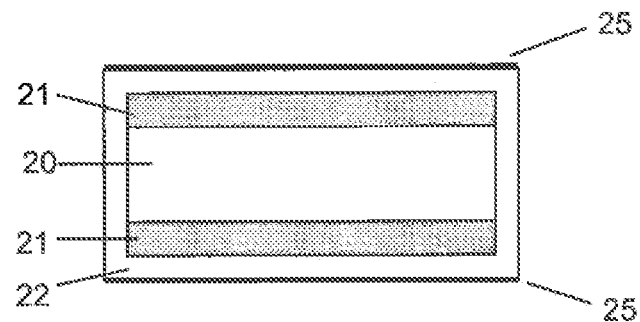
Figure 1F:
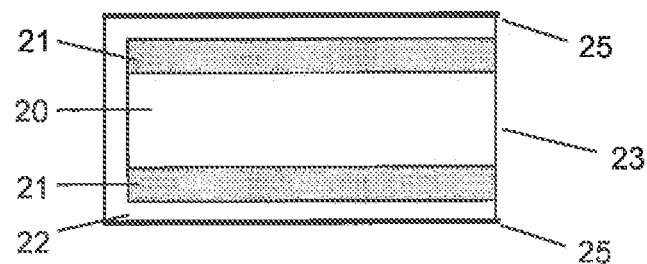
Figure 2:
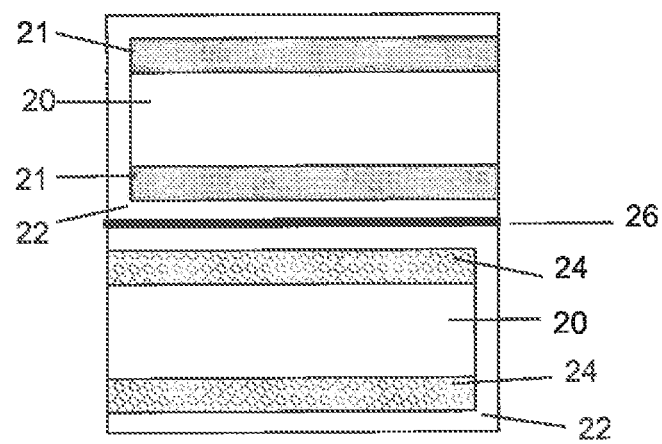
FIG. 2 shows a stack of an anode and a cathode covered with an electrolyte layer and an Ms bonding material layer.

In steps 6.A and 6.B, an edge of the electrodes is cut as shown in FIG. 1d or 1f. Advantageously, the edge connected to the strip is cut so as to leave three edges coated with electrolyte on the edge. As said electrolyte is a dielectric substance, it will make it possible in the next stacking step to expose only the anode contacts on one side of the cell, and cathode contacts on the other side, respectively, in order to form parallel assemblies of the battery elements so as to form a higher-capacity battery cell. FIG. 1d or 1f schematically shows such a cell cross-section after cutting: the substrate 20 has been coated (in this case on both faces) with a cathode layer 21 and cut on an edge 23. In step 7, the stack is produced so that, on two opposite sides of the stack, there is alternately a series of cut anode 21 edges 23 and cathode 21 edges, optionally coated with electrolyte 22, and optionally coated with the Ms bonding material layer 25. FIG. 2 shows a stack of two substrates 20, one of them having, on both faces, an anode layer 21 coated with an electrolyte 22, and an Ms bonding material layer 25 on a single face of the electrolyte layer 22, the other a cathode layer 24 coated with an electrolyte layer 22 and an Ms bonding material layer 25 on the two faces of the electrolyte layer 22, the two faces of the electrolyte layer 22 deposited respectively on the anode 21 and the cathode 24 and each coated with an Ms bonding material layer 25 being placed one on the other so as to form a common interface 26. Thus, the electrical continuity between two adjacent cells is ensured by the electrolyte.

In step 8, a thermal treatment and/or mechanical compression is performed, promoting contact between the two layers stacked face-to-face for an all-solid-state assembly of elementary cells capable of functioning as a battery. Once the stack has been produced, terminals (electrical contacts) 35, 36 are added at the level where the cathode or anode current collectors are visible (not coated with insulating electrolyte). These contact areas may be on opposite sides of the stack in order to collect the current, as shown in FIG. 3, or they may be on the same sides or on adjacent sides.

In a specific embodiment, the stack shown in FIG. 3 is produced by winding two half-electrodes with one another on a mandrel in order to obtain a cylindrical cell. As in the configuration of FIG. 3, the anode connections then emerge on one side, while the cathode connections emerge on the other side.

In a specific embodiment, it is advantageous, preferably after the stacking and before the terminals are added, to encapsulate the stack by depositing a ceramic or a glass-ceramic layer so as to ensure protection of the battery cell from the atmosphere. These encapsulation layers must be chemically stable, resist high temperatures and be impermeable to the atmosphere (barrier layers). These layers may advantageously be deposited by chemical vapor deposition (CVD), which makes it possible to have a covering of all of the accessible stack surfaces. Thus, the encapsulation can be performed directly on the stacks, with the coating being capable of penetrating all of the available cavities. Advantageously, a second encapsulation layer may be deposited on the first encapsulation layer in order to increase the protection of the battery cells from their external environment. Typically, the deposition of this second layer may be performed by silicone impregnation. The choice of such a material is made because it is resistant to high temperatures and the battery can thus easily be assembled by soldering on electronic cards, without the appearance of glass transitions.

Advantageously, the encapsulation of the battery is performed on four of the six faces of the stack. The encapsulation layers surround the periphery of the stack, with the remainder of the protection from the atmosphere being ensured by the layers obtained by the terminals.

Once the stack has been produced, and after the step of encapsulating the stack if this step is performed, terminals (electrical contacts) 35, 36 are added where the cathode, and anode, current collectors are exposed (not covered with insulating electrolyte). These contact areas may be on the opposite sides of the stack in order to collect the current, as shown in FIG. 3, but also on the same sides and on adjacent sides.

To produce the terminals 35, 36, the stack, optionally coated, is cut according to cutting planes making it possible to obtain unitary battery components, with exposure on each of the cutting planes of the connections (+) and (−) of the battery. The connections can then be metallized by means of plasma deposition techniques known to a person skilled in the art. The terminals 35, 36 preferably consist of an external tin layer in order to promote the solderability of the battery, and a nickel layer below the tin layer in order to thermally protect the battery cell.

Thus, the process according to the invention makes it possible to produce all-solid-state three-dimensional batteries, consisting of a plurality of elementary cells, all of the latter being connected with one another in parallel.

The production process according to the invention has numerous advantages because:

(i) it makes it possible to produce compact all-solid-state batteries without using high temperatures;

(ii) the low temperatures used limit the risks of interdiffusion or solid-state reactions at the interfaces;

(iii) the process makes it possible to produce all-solid-state batteries without the risk of cracks associated with shrinkage of the electrodes and electrolyte layers during the assembly step;

(iv) the process according to the invention makes it possible to produce all-solid-state compact batteries by assembly of elementary cells. In fact, the process according to the invention makes it possible to produce three-dimensional assemblies of all-solid-state battery cells. This one-step assembly of all of the cells makes it possible to produce an all-solid-state one-piece battery consisting of a plurality of elementary cells all connected with one another in parallel. The elementary cells are not independent of one another.

The process according to the invention also makes it possible to do without rigid substrates, as the rigidity is conferred by the stacking and all-solid-state assembly of the structure. In addition, this production technology makes it possible to work directly on very thin metallized films, making it possible to obtain battery cells with very high power and energy densities.

Moreover, this technology makes it possible to produce entirely secure batteries, without the risk of an internal short-circuit and having low self-discharges.

Finally, the batteries obtained according to the process have high power and energy densities and can operate under extreme temperature conditions without their physical and chemical properties being altered.

5. Examples

EXAMPLE 1

Assembly of $Ni/Li_4Ti_5O_{12}/LiPON/LiCoO_2/Ni$ a) Preparation of the Substrates Nickel strips with a thickness of 20 μm are provided. On these strips, a thin film of ITO covered with a film of Pt of around 100 nm each were deposited in order to prevent the nickel from being diffused into the electrode materials during the thermal treatment steps. The strips are placed in holding frames so as to create a rigid structure for holding substrates.

b) Deposition of Anode Layer/Deposition of Electrolyte Layer on Anode Layer

An anode layer is deposited on the substrate by a sol-gel method. A solution comprised of PVP poly(vinylpyrrolidone), titanium isopropoxide $(CH_3)_2CHO)_4Ti$, acetic acid $(CH_3COOH)$ and lithium isopropoxide $(Li(OC_3H_7)$ is deposited by dipping on the substrate. The molar chemical composition of this solution is $Li(OC_3H_7)/((CH_3)_2CHO)_4Ti/PVP/CH_3COOH/i-C_3H_7OH=4:5:5:100:100$. This first deposited layer is then dried and sintered at 700° C. for 1 hour, then the step of deposition by dripping of the solution described above is performed. This new deposition performed on the $Li_4Ti_5O_{12}$ layer obtained after sintering is in turn dried, then sintered at 700° C. for 1 hour. The steps are repeated until a dense film of $Li_4Ti_5O_{12}$ with a thickness of 1 μm is obtained.

Once the anode electrode has been produced, a LiPON film with a thickness of 1 μm is deposited by means of the vacuum technique. This LIPON film is produced by spraying a $Li_3PO_4$ target under vacuum in a nitrogen atmosphere.

c) Deposition of the Cathode Layer

A cathode layer is deposited on the nickel substrate by physical deposition. A $LiCoO_2$ target is evaporated under vacuum by RF magnetron spraying with a power of 300 W. Before performing the deposition, the deposition chamber was placed in a vacuum at $5.10-6$ Torr. Pure argon is then used as the gas for the deposition, and the deposition pressure is maintained at 10 mTorr. The $LiCoO_2$ film thus deposited was then thermally treated in the deposition chamber at a temperature of 650° C., for 15 mn by means of halogen lamps.

d) Deposition of an Ms Bonding Material Layer

To facilitate the production of the assembly of the two half-electrodes at the level of the cathode and solid electrolyte surfaces deposited on the anode, nanoparticles of $Li_{1.3}Al_{0.3}Ti_{1.7}(PO_4)_3$ were first deposited on the surface of the cathode. This deposition is performed by immersing the surface of the cathode film in a suspension of nanoparticles of $Li_{1.3}Al_{0.3}Ti_{1.7}(PO_4)_3$ were in ethanol. The particle sizes are on the order of 15 nm. The cathode film is dipped in the colloidal suspension of $Li_{1.3}Al_{0.3}Ti_{1.7}(PO_4)_3$ were and removed at a speed of 100 mm/min. The deposited thickness is on the order of 50 nm.

e) Assembly of Electrodes in Order to Produce Multilayer Cells

The assembly between the cathode coated with the Ms bonding material and the anode coated with the solid electrolyte film (LiPON) was performed by an annealing treatment, and with a contact pressure between the two surfaces to be assembled of 80 MPa. The temperature increase rate was 100° C./min up to 450° C. followed by maintenance at this temperature for 5 minutes before cooling the assembly.

A solid assembly of Ni/Li4Ti5O12/LiPON/LiCoO2/Ni, with the Ms bonding material at the interface between the LiPON and the $LiCoO_2$ cathode.

EXAMPLE 2

Assembly of Ni/$Li_4Ti_5O_{12}$/$Li_3Sc_{1.6}Al_{0.4}(PO_4)_3$/$LiCoO_2$/Ni a) Preparation of the Substrates Nickel strips with a thickness of 10 μm are provided. On these strips, a thin palladium film of around 100 nm each were deposited. The strips are placed in holding frames so as to create a rigid structure for holding substrates.

b) Deposition of Anode Layer/Deposition of Electrolyte Layer on Anode Layer

An anode layer is deposited on the substrate by a sol-gel method. A solution comprised of PVP poly(vinylpyrrolidone), titanium isopropoxide $(CH_3)_2CHO)_4Ti$, acetic acid ($CH_3COOH$) and lithium isopropoxide ($Li(OC_3H_7)$) is deposited by dipping on the substrate. The molar chemical composition of this solution is $Li(OC_3H_7)/((CH_3)_2CHO)_4Ti/PVP/CH_3COOH/i-C_3H_7OH=4:5:5:100:100$. This first deposited layer is then dried and sintered at 700° C. for 1 hour, then the step of deposition by dripping of the solution described above is performed. This new deposition performed on the $Li_4Ti_5O_{12}$ layer obtained after sintering is in turn dried, then sintered at 700° C. for 1 hour. The steps are repeated until a dense film of $Li_4Ti_5O_{12}$ with a thickness of 1 μm is obtained.

Once the anode electrode has been produced, a LiPON film of $Li_3Sc_{1.6}Al_{0.4}(PO_4)_3$ with a thickness of 1 μm is deposited by means of the vacuum technique.

c) Deposition of the Cathode Layer

A cathode layer is deposited on the nickel substrate by physical deposition. A $LiCoO_2$ target is evaporated under vacuum by RF magnetron spraying with a power of 300 W. Before performing the deposition, the deposition chamber was placed in a vacuum at 5.10-6 Torr. Pure argon is then used as the gas for the deposition, and the deposition pressure is maintained at 10 mTorr. The $LiCoO_2$ film thus deposited was then thermally treated in the deposition chamber at a temperature of 650° C., for 15 mn by means of halogen lamps.

d) Deposition of an Ms Bonding Material Layer

To facilitate the production of the assembly of the two half-electrodes at the level of the cathode and solid electrolyte surfaces deposited on the anode, nanoparticles of $Li_3Sc_{1.6}Al_{0.4}(PO_4)_3$ were first deposited on the cathode. This deposition was performed by immersing the surface of the cathode film in a suspension of nanoparticles of $Li_3Sc_{1.6}Al_{0.4}(PO_4)_3$ in ethanol. The particle sizes are on the order of 15 nm. The cathode film is dipped in the colloidal suspension of $Li_3Sc_{1.6}Al_{0.4}(PO_4)_3$ and removed at a speed of 100 mm/min. The deposited thickness is on the order of 50 nm.

e) Assembly of Electrodes in Order to Produce Multilayer Cells

Before being stacked, the anodes coated with the solid electrolyte film and the cathodes were "punched" in order to produce cutouts with the dimensions of the battery to be produced. These patterns (cf. FIGS. 6 and 7, references B) include the three cutouts that adjoin one another and that define the dimension of the battery. A second slot (cf. FIGS. 6 and 7, reference A) was produced on the non-cut side so as to be capable of ensuring the passage of the products necessary for encapsulation of the component.

The deposition of Ms bonding material can be performed after or before this electrode punching step. The anode and cathode electrodes were then stacked alternately so as to form a stack of a plurality of elementary cells. The anode and cathode cutout patterns were placed in a "head-to-tail" configuration as shown in FIG. 7. This stack was then pressed at 50 MPa and heated at 350° C. for 10 minutes in order to obtain a one-piece and rigid multilayer stacked structure.

This assembly of stacked sheets was then placed in a deposition chamber under vacuum in order to produce a deposit conforming to a protective encapsulation material that will cover the entirety of the surfaces of said stack, including inside the cutout areas. The orifices A (cf. FIGS. 6 and 7) promote the penetration of the material deposited on the inner faces of the stacked layers. This protective material may be a hexamethyldisiloxane (HMDSO) coating deposited by plasma-enhanced chemical vapor deposition. This first coating layer enables the battery cell to be protected from the external environment and more specifically from moisture. A second layer of 15 μm of silicone is then applied by injection in order to coat the battery cells with a layer that will protect the batteries from mechanical damage.

This assembly of battery elements, stacked and coated, is then cut out according to cutting planes making it possible to obtain unity battery components, with exposure on each of the cutting planes of the connections (+) and (−) of the batteries, on opposite faces. These connections are then metallized by means of plasma deposition techniques in order to obtain the battery component shown in FIG. 8. The terminals consist of a nickel layer thermally protecting the battery cell and a tin layer facilitating the solderability of the battery obtained.

f) Assembly of the Electrodes

The assembly between the cathode coated with the Ms bonding material and the anode coated with the solid electrolyte film of $Li_3Sc_{1.6}Al_{0.4}(PO_4)_3$ was performed by an annealing treatment, and with a contact pressure between the two surfaces to be assembled of 80 MPa. The temperature increase rate was 100° C./min up to 450° C. followed by maintenance at this temperature for 5 minutes before cooling the assembly.

A solid assembly of Ni/$Li_4Ti_5O_{12}$/$Li_3Sc_{1.6}Al_{0.4}(PO_4)_3$/$LiCoO_2$Ni, with the Ms bonding material at the interface between the $Li_3Sc_{1.6}Al_{0.4}(PO_4)_3$ and the $LiCoO_2$ cathode.

What is claimed is:

1. A process for producing all-inorganic, all-solid-state batteries, said all-inorganic, all-solid-state batteries including at least one dense first layer containing anode materials ("anode layer"), at least one dense second layer containing solid electrolyte materials ("electrolyte layer"), and at least one dense third layer containing cathode materials ("cathode layer") in order to obtain an all-solid-state battery having an assembly of a plurality of elementary cells, said process comprising:

(a) depositing the dense anode layer and the dense cathode layer on respective conductive substrates, said conductive substrates being capable of serving as an anode and cathode current collector, respectively;

(b) depositing the solid dense electrolyte layer on at least one of the two layers obtained in step (a);

(c) depositing a layer of nanoparticles ("nanoparticles layer") of at least one Ms inorganic bonding material, by electrophoresis, on at least one of the dense layers obtained in step (a) and/or (b), wherein the depositions of the layers of steps (a), (b) and (c) are not all performed by electrophoresis, and the melting point of the nanoparticle layer is less than that of the layers with which it is in contact;

(d) stacking the layer obtained in step (c) face-to-face with a layer obtained in step (a), (b) or (c);

(e) performing a mechanical compression promoting contact between said two layers stacked face-to-face in order to obtain an all-solid-state assembly of elementary cells capable of functioning as a battery.

2. The process of claim 1, wherein step (e) includes performing a thermal treatment.

3. The process of claim 2, wherein the thermal treatment performed is performed at a temperature $T_R$ which, preferably, does not exceed one of 0.7, 0.5, or 0.3 times the melting or decomposition temperature (expressed in ° C.) of the at least one most fusible Ms bonding material subjected to said thermal treatment step.

4. The process of claim 1, wherein the mechanical compression is performed at a pressure of between one of 10 and 100 MPa, and 10 and 50 MPa.

5. The process of claim 1, wherein the depositions of the layers of steps (a), (b) and (c) are performed by vapor and/or wet deposition.

6. The process of claim 5, wherein the vapor deposition is performed using at least one of the following techniques:
   (i) physical vapor deposition (PVD) including vacuum evaporation, laser ablation, ion beam, or cathode sputtering;
   (ii) chemical vapor deposition (CVD) including plasma-enhanced chemical vapor deposition (PECVD), laser-assisted chemical vapor deposition (LACVD), or aerosol-assisted chemical vapor deposition (AA-CVD);
   (iii) electrospraying; and
   (iv) aerosol deposition.

7. The process of claim 5, wherein the wet deposition is performed using at least one of the following techniques:
   (i) electrophoresis;
   (ii) sol-gel; and
   (iii) dipping, including dip-coating, spin-coating or a Langmuir-Blodgett process.

8. The process of claim 1, wherein the at least one Ms inorganic bonding material is selected from one or more of the following materials:
   (a) oxide-based materials chosen from $Li_{3.6}Ge_{0.6}V_{0.4}O_4$; $Li_2O$—$Nb_2O_5$; $LiSiO_4$; $Li_2O$; $Li_{14}Zn(GeO_4)_4$; $Li_6Zr_2O_7$; $Li_8ZrO_6$; $Li_{0.35}La_{0.55}TiO_3$; $Li_{0.5}La_{0.5}TiO_3$; $Li_7La_3Zr_2O_{12}$; $Li_{5+x}La_3(Zr_x,A_{2-x})O_{12}$) with A=Sc, Ti, V, Y, Nb, Hf, Ta, Al, Si, Ga, Ge, Sn and $1.4 \le x \le 2$;
   (b) nitride- or oxynitride-based materials chosen from $Li_3N$; $Li_3PO_{4-x}N_{2x/3}$, $Li_4SiO_{4-x}N_{2x/3}$, $Li_4GeO_{4-x}N_{2x/3}$ with $0<x \le 4$ or $Li_3BO_{3-x}N_{2x/3}$ with $0<x<3$; lithium and phosphorus oxynitride-based materials (called LiPON) that may also contain silicon (called LiSiPON), boron (called LiPONB), sulfur (called LiPONS), zirconium or aluminum (called LiPAON) or a combination of aluminum, boron, sulfur and/or silicon; the lithium and boron oxynitride-based materials (called LiBON) that may also contain silicon (called LiSiBON), sulfur (called (LIBONS) or aluminum (called LiBAON) or a combination of aluminum, sulfur and silicon; and more specifically materials of the $Li_xPO_yN_z$ type with $x\sim2.8$ and $2y=3z$ with $0.16 \le z \le 0.46$; or $Li_wPO_xN_yS_z$ with $(2x+3y+2z)=(5+w)$ and $3.2 \le x \le 3.8$; $0.13 \le y \le 0.4$; $0 \le z \le 0.2$; $2.9 \le w \le 3.3$; or $Li_tP_xAl_yO_uN_vS_w$ with $(5x+3y)=5$; $(2u+3v+2w)=(5+t)$; $2.9 \le t$ $3.3$; $0.84 \le x \le 0.94$; $0.094 \le y \le 0.26$; $3.2 \le u \le 3.8$; $0.13 \le v \le 0.46$; $0 \le w \le 0.2$; or $Li_{1.9}Si_{0.2}P_{1.0}O_{1.1}N_{1.0}$; or $Li_{2.9}PO_{3.3}N_{0.46}$; or $Li_{6-0.75x}P_{1.75x}Zr_{2-2x}O_{7-y}N_z$ with $z \le 14/3$; $2y=3z$ and $x \le 0.8$; or $Li_{8-3.5x}P_{1.5x}Zr_{1-x}O_{z6-y}N_z$ with $x \le 0.8$; $z \le 4$ and $2y=3z$; or $Li_{8-3x}La_xZrO_{6-y}N_z$ with $0 \le x \le 2$; $z \le 4$ and $2y=3z$; or $Li_3(Sc_{2-x}M_x)(PO_{4-y}N_z)$ with $x \le 2$; $z \le 8/3$; $2y=3z$ and M=Al, Y or $Al_{1-a}Y_a$ with $a<1$;
   (c) sulfide-based materials chosen from: $Li_xM_{1-y}M'_yS_4$ with M=Si, Ge, Sn and M'=P, Al, Zn, Ga, Sb; $Li_2S$; $B_2S_3$; $P_2S_5$; $70Li_2S$–$30P_2S_5$; $Li_7P_3S_{11}$; $Li_{10}GeP_2S_{12}$; $Li_7PS_6$; $Li_{3.25}Ge_{0.25}P_{0.75}S_4$; $Li_{10}MP_2S_{12}$ with M=Si, Ge, Sn and mixtures between $Li_2S$ and one of the compounds among $P_2S_5$, $GeS_2$, $Ga_2S_3$ or $SiS_2$;
   (d) phosphate or borate-based materials chosen from $Li_3PO_4$; $LiTi(PO_4)_3$; $Li_{1+x}Al_xM_{2-x}(PO_4)_3$ (where M=Ge, Ti, and/or Hf and $0<x$ 1); $Li_{1.3}Al_{0.3}Ti_{1.7}(PO_4)_3$; $Li_{1+x+y}Al_xTi_{2-x}Si_yP_{3-y}O_{12}$ (where $0 \le x \le 1$ and $0 \le y \le 1$); $Li_{1+z+x}M_x$ $(Ge_{1-y}Ti_y)_{2-x}Si_zP_{3-z}O_{12}$ (where $0 \le x \le 0.8$, $0 \le y \le 1.0$, $0 \le z \le 0.6$); $2(Li_{1.4}Ti_2Si_{0.4}P_{2.6}O_{12})$—$AlPO_4$; $Li_xAl_{z-y}Ga_yS_w(PO_4)_c$ or $Li_xAl_{z-y}Ga_yS_w(BO_3)_c$ or $Li_xGe_{z-y}Si_yS_w(PO_4)_c$ or $Li_xGe_{z-y}Si_yS_w(BO_3)_c$ or more generally $Li_xM_{z-y}M'_yS_w(PO_4)_c$ or $Li_xM_{z-y}M'_yS_w(BO_3)_c$ with $4<w<20$, $3<x<10$, $0 \le y \le 1$, $1 \le z \le 4$ and $0<c<20$ and M or M' an element among Al, Si, Ge, Ga, P, Zn, Sb; or $Li_3Sc_{2-x}M_xPO_4$ with M=Al, Y or $A_{1-a}Y_a$ with $a<1$; and
   (e) mixed materials chosen from the mixtures between $Li_2S$ and one of the compounds among $Li_3PO_4$, $Li_3PO_{4-x}N_{2x/3}$, $Li_4SiO_{4-x}N_{2x/3}$, $Li_4GeO_{4-x}N_{2x/3}$ with $0<x<4$ or $Li_3BO_{3-x}N_{2x/3}$ with $0<x<3$; the mixtures between $Li_2S$ and/or $B_2S_3$ $SiS_2$, $P_2S_5$, $GeS_2$, $Ga_2S_3$ and a compound of the $Li_aMO_b$ type, which may be a lithium silicate $Li_4SiO_4$, a lithium borate $Li_3BO_3$ or a lithium phosphate $Li_3PO_4$.

9. The process of claim 1, wherein the thickness of the layer of the at least one Ms inorganic bonding material is less than one of 100 nm, 50 nm, and 30 nm.

10. The process of claim 1, further comprising encapsulating the battery by depositing at least one encapsulation layer.

11. An all-inorganic, all-solid-state battery having an assembly of a plurality of elementary cells, the all-inorganic, all-solid-state battery comprising:
   at least one dense first layer containing anode materials ("anode layer") deposited on a first conductive substrate which is capable of serving as an anode current collector;
   at least one dense third layer containing cathode materials ("cathode layer") deposited on a second conductive substrate which is capable of serving as a cathode current collector;
   at least one dense second layer containing solid electrolyte materials ("electrolyte layer") deposited on at least one of the anode layer and the cathode layer; and
   a layer of nanoparticles ("nanoparticles layer") of at least one Ms inorganic bonding material, deposited by electrophoresis on at least one of the anode layer, the cathode layer, and the electrolyte layer,
   wherein:
      the depositions of the anode layer, the cathode layer, the electrolyte layer, and the nanoparticles layer are not all performed by electrophoresis,
      the melting point of the nanoparticle layer is less than that of one the layers with which it is in contact;
      the anode layer, the cathode layer, the electrolyte layer, and the nanoparticles layer are arranged face-to-face in a stack;
      the stack is mechanically compressed to promote contact between the layers stacked face-to-face.

12. An all-solid-state multilayer battery having an assembly of a plurality of elementary cells, the all-solid-state multilayer battery comprising:
- at least one dense first layer containing anode materials ("anode layer") deposited on a first conductive substrate which is capable of serving as an anode current collector;
- at least one dense third layer containing cathode materials ("cathode layer") deposited on a second conductive substrate which is capable of serving as a cathode current collector;
- at least one dense second layer containing solid electrolyte materials ("electrolyte layer") deposited on at least one of the anode layer and the cathode layer; and
- a layer of nanoparticles ("nanoparticles layer") of at least one Ms inorganic bonding material, deposited by electrophoresis on at least one of the anode layer, the cathode layer, and the electrolyte layer,
- wherein:
  - the depositions of the anode layer, the cathode layer, the electrolyte layer, and the nanoparticles layer are not all performed by electrophoresis,
  - the melting point of the nanoparticle layer is less than that of one the layers with which it is in contact;
  - the anode layer, the cathode layer, the electrolyte layer, and the nanoparticles layer are arranged face-to-face in a stack;
- the stack is mechanically compressed to promote contact between the layers stacked face-to-face.

13. The all-solid-state multilayer battery of claim 12, wherein the plurality of elementary cells are connected with one another in parallel.

14. The all-solid-state multilayer battery of claim 12, wherein the first conductive substrate and the second conductive substrate respectively comprise one of:
- metal sheets coated with a noble metal; or
- polymer sheets coated with a noble metal; or
- graphite sheets coated with a noble metal.

15. The all-solid-state multilayer battery of claim 14, wherein the metal sheets comprises aluminum, copper, or nickel.

16. The all-solid-state multilayer battery of claim 14, wherein the polymer sheets are selected from the following polymers: polyethylene naphthalate (PEN), polyethylene terephthalate (PET), polypropylene (PP), Teflon® (PTFE), polyimide (PI) and more specifically Kapton®.

17. The all-solid-state multilayer battery of claim 14, wherein the noble metal is selected from the following metals: gold, platinum, palladium, vanadium, cobalt, nickel, manganese, niobium, tantalum, chromium, molybdenum, titanium, palladium, zirconium, tungsten, or any alloy including at least one of these metals.

18. The all-solid-state multilayer battery of claim 12, further comprising an encapsulation layer that includes a ceramic or a a glass-ceramic.

19. The all-solid-state multilayer battery of claim 18, further comprising a second encapsulation layer deposited on the encapsulation layer.

20. The all-solid-state multilayer battery of claim 19, wherein the second encapsulation layer comprises a silicone polymer.

21. The all-solid-state multilayer battery of claim 18, wherein the encapsulation layer covers four of six faces of the all-inorganic, all-solid-state multilayer battery.

22. The all-solid-state multilayer battery of claim 12, further comprising terminals where the cathode current collector and anode current collector, respectively, are visible.

23. The all-solid-state multilayer battery of claim 22, wherein the anode current connectors and the cathode connecters are located on opposite sides of the stack.

24. The all-solid-state multilayer battery of claim 22, wherein the terminals are covered with a nickel layer in contact with electrochemical cells, said nickel layer being covered with a tin layer.

25. The all-solid-state multilayer battery of claim 12, wherein the all-solid-state multilayer battery is all-inorganic.

* * * * *